Figure 1:
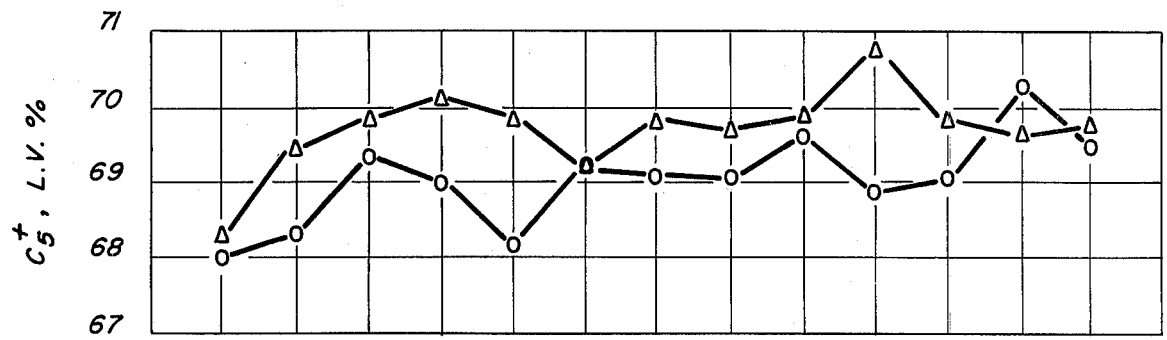

| United States Patent [19] | [11] | 4,210,523 |
|---|---|---|
| Antos | [45] | Jul. 1, 1980 |

[54] HYDROCARBON CONVERSION WITH A SUPERACTIVE MULTIMETALLIC CATALYTIC COMPOSITE CONTAINING TWO DIFFERENT TYPES OF RHENIUM SITES

[75] Inventor: George J. Antos, Bartlett, Ill.

[73] Assignee: UOP Inc., Des Plaines, Ill.

[21] Appl. No.: 13,491

[22] Filed: Feb. 21, 1979

Related U.S. Application Data

[63] Continuation-in-part of Ser. No. 888,708, Mar. 20, 1978, Pat. No. 4,149,962.

[51] Int. Cl.$^2$ .............................................. C10G 35/08
[52] U.S. Cl. .................................. 208/139; 208/111; 208/138; 252/441; 252/466 PT; 585/419; 585/434; 585/748
[58] Field of Search ................ 208/138, 139; 252/441, 252/466 PT

[56] References Cited

U.S. PATENT DOCUMENTS

| 3,415,737 | 10/1968 | Kluksdehl | 208/139 |
| 4,149,962 | 4/1979 | Antos | 208/139 |

*Primary Examiner*—C. Davis
*Attorney, Agent, or Firm*—James R. Hoatson, Jr.; Thomas K. McBride; William H. Page, II

[57] ABSTRACT

Hydrocarbons are converted by contacting them at hydrocarbon conversion conditions with a novel superactive multimetallic catalytic composite comprising a reduced combination of a catalytically effective amount of an adsorbed rhenium-oxygen complex with a porous carrier material containing a catalytically effective amount of a conventional rhenium component and a uniform dispersion of a catalytically effective amount of a platinum group component which is maintained in the elemental metallic state during the adsorption and reduction of the rhenium-oxygen complex. A key feature associated with the preparation of the subject catalytic composite is reaction of a rhenium-oxygen complex with a porous carrier material containing a conventional rhenium component and a uniform dispersion of a platinum group component maintained in the elemental state, whereby the interaction of the rhenium-oxygen complex with the platinum group metal moiety is maximized due to the platinophilic (i.e. platinum-seeking) propensities of the oxygen ligands used in the rhenium reagent. A specific example of the type of hydrocarbon conversion process disclosed herein is a process for the catalytic reforming of a low octane gasoline fraction wherein the gasoline fraction and a hydrogen stream are contacted with the subject superactive multimetallic catalytic composite at reforming conditions.

23 Claims, 6 Drawing Figures

Catalyst Life, Days On Oil.

Catalyst Life, Days On Oil 4,210,523

HYDROCARBON CONVERSION WITH A SUPERACTIVE MULTIMETALLIC CATALYTIC COMPOSITE CONTAINING TWO DIFFERENT TYPES OF RHENIUM SITES

CROSS-REFERENCE TO RELATED APPLICATION

This application is a continuation-in-part of my prior copending application Ser. No. 888,708 filed Mar. 20, 1978, and issued as U.S. Pat. No. 4,149,962 on Apr. 17, 1979. All of the teachings of this prior application are specifically incorporated herein by reference.

The subject of the present invention is a novel superactive multimetallic catalytic composite which has remarkably superior activity, selectivity and resistance to deactivation when employed in a hydrocarbon conversion process that requires a catalytic agent having both a hydrogenation-dehydrogenation function and a carbonium ion-forming function. The present invention, more precisely, involves a novel dual-function superactive multimetallic catalytic composite which quite surprisingly enables substantial improvements in hydrocarbon conversion processes that have traditionally used a platinum group metal-containing, dual function catalyst. According to another aspect, the present invention comprehends the improved processes that are produced by the use of the instant superactive platinum-rhenium catalyst system which is characterized by a unique reaction between a rhenium-oxygen complex and a porous carrier material containing a conventional rhenium component and a uniform dispersion of a platinum group component maintained in the elemental metallic state, whereby the interaction between the rhenium-oxygen complex and the platinum group moiety is maximized on an atomic level. In a specific aspect, the present invention concerns a catalytic reforming process which utilizes the subject catalyst to markedly improve activity, selectivity and stability characteristics associated therewith to a degree not heretofore realized for a platinum-rhenium catalyst system. Specific advantages associated with use of the present superactive platinum-rhenium system in a catalytic reforming process relative to those observed with the prior art platinum-rhenium catalyst system are: (1) increased ability to make octane at low severity operating conditions; (2) enhanced capability to maximize $C_5+$ reformate yield and hydrogen production by operating at severity levels at which the prior art system has not been successfully employed; (3) Ability to substantially expand the catalyst life before regeneration becomes necessary in conventional temperature-limited catalytic reforming units; (4) increased tolerance to conditions which are known to increase the rate of production of deactivating coke deposits; (5) Significantly diminished requirements for amount of catalyst to achieve same results as the prior art catalyst system at no sacrifice in catalyst life before regeneration; and (6) Capability of operating at significantly increased charge rates with the same amount of catalyst and at similar conditions as the prior art catalyst system without any sacrifice in catalyst life before regeneration.

Composites having a hydrogenation-dehydrogenation function and a carbonium ion-forming function are widely used today as catalysts in many industries, such as the petroleum and petrochemical industry, to accelerate a wide spectrum of hydrocarbon conversion reactions. Generally, the carbonium ion-forming function is thought to be associated with an acid-acting material of the porous, absorptive, refractory oxide type which is typically utilized as the support or carrier for a heavy metal component such as the metals or compounds of metals of Groups V through VIII of the Periodic Table to which are generally attributed the hydrogenation-dehydrogenation function.

These catalytic composites are used to accelerate a wide variety of hydrocarbon conversion reactions such as hydrocracking, hydrogenolysis, isomerization, dehydrogenation, hydrogenation, desulfurization, cyclization, polymerization, alkylation, cracking, hydroisomerization, dealkylation, transalkylation, etc. In many cases, the commercial applications of these catalysts are in processes where more than one of the reactions are proceeding simultaneously. An example of this type of process is reforming wherein a hydrocarbon feedstream containing paraffins and naphthenes is subjected to conditions which promote dehydrogenation of naphthenes to aromatics, dehydrocyclization of paraffins to aromatics, isomerization of paraffins and naphthenes, hydrocracking and hydrogenolysis of naphthenes and paraffins, and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is a hydroisomerization process wherein a hydrocarbon fraction which is relatively rich in straight-chain paraffin compounds is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as $H_2$; (2) selectivity refers to the amount of desired product or products obtained relative to the amount of reactants charged or converted; (3) stability refers to the rate of change with time of the activity and selectivity parameters—obviously, the smaller rate implying the more stable catalyst. In a reforming process, for example, activity commonly refers to the amount of conversion that takes place for a given charge stock at a specified severity level and is typically measured by octane number of the $C_5+$ product stream, selectivity refers to the amount of $C_5+$ yield, relative to the amount of the charge, that is obtained at the particular activity or severity level; and stability is typically equated to the rate of change with time of activity, as measured by octane number of $C_5+$ product and of selectivity as measured by $C_5+$ yield. Actually the last statement is not strictly correct because generally a continuous reforming process is run to produce a constant octane $C_5+$ product with severity level being continuously adjusted to attain this result; and furthermore, the severity level is for this process usually varied by adjusting the conversion temperature in the reaction so that, in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes the conditions utilized typically result in the formation of heavy, high molecular weight, black, solid or semi-solid, carbonaceous material which is a hydrogen-deficient polymeric substance having properties akin to both polynuclear aromatics and graphite. This material coats the surface of the catalyst and thus reduces its activity by shielding its active sites from the reactants. In other words, the performance of this dual-function catalyst is sensitive to the presence of carbonaceous deposits or coke on the surface of the catalyst. Accordingly, the major problem facing workers in this area of the art is the development of more active and/or selective catalytic composites that are not as sensitive to the presence of these carbonaceous materials and/or have the capability to suppress the rate of the formation of these carbonaceous materials on the catalyst. Viewed in terms of performance parameters, the problem is to develop a dual-function catalyst having superior activity, selectivity, and stability characteristics. In particular, for a reforming process the problem is typically expressed in terms of shifting and stabilizing the $C_5+$ yield-octane relationship at the lowest possible severity level—$C_5+$ yield being representative of selectivity and octane being proportional to activity.

I have now found a dual-function superactive multimetallic catalytic composite which possesses improved activity, selectivity and stability characteristics relative to similar catalysts of the prior art when it is employed in a process for the conversion of hydrocarbons of the type which have heretofore utilized dual-function, platinum group metal-containing catalytic composites such as processes for isomerization, hydroisomerization, dehydrogenation, desulfurization, denitrogenization, hydrogenation, alkylation, dealkylation, disproportionation, polymerization, hydrodealkylation, transalkylation, cyclization, dehydrocyclization, cracking, hydrocracking, halogenation, reforming and the like processes. In particular, I have now established that a superactive multimetallic catalytic composite, comprising a reduced combination of a catalytically effective amount of an adsorbed rhenium-oxygen complex with a porous carrier material containing catalytically effective amounts of a platinum group component and of a conventional rhenium component, can enable the performance of hydrocarbon conversion processes utilizing dual-function catalysts to be substantially improved if the platinum group component is relatively uniformly dispersed throughout the porous carrier material prior to contact with the rhenium-oxygen complex, if the oxidation state of the platinum group component is maintained in the elemental metallic state prior to and during contact with the rhenium-oxygen complex and if the absorbed rhenium-oxygen complex is reduced to the elemental metallic state under conditions that prevent the agglomerization of the platinum group component. A specific example of my discovery involves my finding that a superactive acidic multimetallic catalytic composite, comprising a conbination of a catalytically effective amount of an adsorbed rhenium-oxygen complex with a porous carrier material containing a uniform dispersion of a catalytically effective amount of a platinum group component maintained in the elemental metallic state and catalytically effective amounts of a halogen component and of a conventional rhenium component, can be utilized to substantially improve the performance of a hydrocarbon reforming process which operates on a low octane gasoline fraction to produce a high octane reformate or aromatic-rich reformate. In the case of a reforming process, some of the major advantages associated with the use of the novel multimetallic catalytic composite of the present invention include: (1) acquisition of the capability to operate in a stable manner in a high severity operation; for example, a low or moderate pressure reforming process designed to produce a $C_5+$ reformate having an octane of at least about 100 F-1 clear; (2) increased activity and selectivity for octane upgrading reactions relative to the performance of prior art bimetallic platinum-rhenium catalyst systems as exemplified by the teachings of Kluksdahl in his U.S. Pat. No. 3,415,737; (3) enhanced capability to operate for extended periods of time in high severity, temperature-limited existing catalytic reforming units; and (4) significantly augmented $C_5+$ yield selectivity relative to the platinum-rhenium catalyst system disclosed in my prior application Ser. No. 888,708. In sum, the present invention involves the remarkable finding that the addition of an adsorbed rhenium-oxygen complex to a porous carrier material containing a catalytically effective amount of a conventional rhenium component and a uniform dispersion of a catalytically effective amount of a platinum group component maintained in the elemental metallic state, can enable the performance characteristics of the resulting superactive multimetallic reduced catalytic composite to be sharply and materially improved relative to those associated with the prior art platinum-rhenium catalyst system. An ancillary finding relative to the teachings of the novel platinum-rhenium catalyst system of my prior application Ser. No. 888,708 is that there is a significant $C_5+$ yield advantage associated with adding a conventional rhenium component thereto; that is that I have now found that it is not necessary for all of the rhenium in this prior catalyst system to be derived from the adsorbed rhenium-oxygen complex and in fact there is a selectivity advantage associated with the use of a conventional rhenium component in this catalyst system.

It is, accordingly, an object of the present invention to provide a superactive multimetallic hydrocarbon conversion catalyst having superior performance characteristics relative to the prior art platinum-rhenium catalyst system when utilized in a hydrocarbon conversion process. A second object is to provide a superactive multimetallic acidic catalyst having dual-function hydrocarbon conversion performance characteristics which are relatively insensitive to the deposition of coke-forming, hydrocarbonaceous materials thereon and to the presence of sulfur contaminants in the reaction environment. A third object is to provide preferred methods of preparation of this superactive multimetallic catalytic composite which methods insure the achievement and maintenance of its unique properties. Another object is to provide a substantially improved platinum-rhenium catalyst system having superior selectivity characteristics relative to the platinum-rhenium catalyst system disclosed in my prior application Ser. No. 888,708. Another object is to provide a novel acidic multimetallic hydrocarbon conversion catalyst which utilizes an adsorbed rhenium-oxygen complex to beneficially interact with and selectively promote an acidic catatlyst containing a conventional rhenium compoment, a halogen component and a uniform dispersion of a platinum group component maintained in the metallic state during the incorporation of the rhenium-oxygen complex.

Without the intention of being limited by the following explanation, I believe my discovery that an adsorbed rhenium-oxygen complex can, quite unexpectedly, be used under the circumstances described herein to synthesize an entirely new type of platinum-rhenium catalyst system, is attributable to one or more unusual and unique routes to greater platinum-rhenium interaction that are opened or made available by the novel chemistry associated with the reaction or adsorption of a rhenium-oxygen complex with or by a supported, uniformly dispersed platinum group metal. Before considering in detail each of these possible routes to greater platinum-rhenium interaction it is important to understand that: (1) "platinum" is used herein to mean any one of the platinum group metals; (2) by use of the term "conventional rhenium component" I mean a rhenium component that is incorporated into the catalytic composite according to any of the techniques known to the prior art but which specifically excludes the type of rhenium component that results from my adsorbed rhenium-oxygen complex procedure as disclosed in my prior application Ser. No. 888,708; (3) the unexpected results achieved with my catalyst systems are measured relative to the catalyst system of my prior invention as disclosed in application Ser. No. 888,708 and to the conventional platinum-rhenium catalyst system as taught in, for example, the Kluksdahl U.S. Pat. No. 3,415,737; and (4) the expression "rhenium moiety" is intended to mean the catalytically active form of the rhenium entity (or the specific type of rhenium sites associated therewith) in the catalyst system derived from the adsorbed rhenium-oxygen complex after it has been reduced to the elemental metallic state under the circumstances specifically disclosed hereinafter. One route to greater platinum-rhenium interaction enabled by the present invention comes from the theory that the effect of rhenium on a platinum catalyst is very sensitive to the particle size of the rhenium moiety; since in my procedure a portion of the rhenium is put on the catalyst in a form where it is complexed with oxygen molecules which are known to have a strong affinity for platinum metal, it is reasonable to assume that when the platinum is widely dispersed on the support, one effect of the oxygen ligands is to pull the rhenium moiety precursor towards the platinum sites on the catalyst, thereby achieving a dispersion and particle size of the rhenium moiety in the catalyst which closely imitates the corresponding platinum conditions (i.e., this might be called a piggy-back theory). The second route to greater platinum-rhenium interaction is similar to the first and depends on the theory that the effect of rhenium on a platinum catalyst is at a maximum when the rhenium moiety is attached to individual platinum sites; the use of platinophilic oxygen ligands, as called for by the present invention, then acts to facilitate adsorption or chemisorption of the rhenium moiety on the platinum site so that a substantial portion of the rhenium moiety is deposited or fixed on or near the platinum site where the platinum acts to anchor the rhenium, thereby making it more resistant to sintering at high temperature. The third route to greater platinum-rhenium interaction is based on the theory that the active state for the rhenium moiety in the rhenium-platinum catalyst system is the elemental metallic state and that the best platinum-rhenium interaction is achieved when the proportion of the rhenium in the metallic state is maximized; reducing a rhenium-oxygen complex adsorbed on or near an elemental platinum metal site with hydrogen acts to increase the reducing power of the hydrogen because the presence of the platinum metal activates the hydrogen reductant by dissociating some of the hydrogen molecules into two hydrogen atoms each of which has an unpaired electron and these activated hydrogen atoms enable better and more thorough reduction of the adsorbed rhenium-oxygen complex to rhenium metal. Another theory for explaining the greater platinum-rhenium interaction associated with the instant catalyst is derived from the idea that the most active sites for the platinum-rhenium catalyst are basically platinum metal crystallites that have had their surface enriched in rhenium metal; since the concept of the present invention requires a portion of the rhenium to be laid down on the surface of well-dispersed platinum metal crystallites via a platinophilic rhenium-oxygen complex, the probability of surface enrichment is greatly increased for the present procedure relative to that associated with the random, independent dispersion of both crystallites that has characterized the prior art preparation procedures. It is of course to be recognized that all of these factors may be involved to some degree in the overall explanation of the impressive results associated with my superactive catalyst system.

Against this background then, the present invention is in one embodiment a novel superactive bimetallic catalytic composite having two distinct types of rhenium sites and comprising a reduced combination of a catalytically effective amount of an adsorbed rhenium-oxygen complex with a porous material containing catalytically effective amounts of a conventional rhenium component and of a platinum group component wherein the platinum group component is uniformly dispersed in the carrier material and is maintained in the elemental metallic state during the adsorption and reduction of the rhenium-oxygen complex and wherein at least a portion of the rhenium-oxygen complex is adsorbed on the surface of the platinum group component prior to the reduction of the rhenium-oxygen complex.

In another embodiment, the subject superactive catalytic composite comprises a reduced combination of a catalytically effective amount of adsorbed rhenium-oxygen complex with a porous carrier material containing catalytically effective amounts of a conventional rhenium component, a halogen component and of a platinum group component wherein the platinum group component is uniformly dispersed in the carrier material and is maintained in the elemental metallic state during the adsorption and reduction of the rhenium-oxygen complex and wherein at least a portion of the rhenium-oxygen complex is adsorbed on the surface of the platinum group component prior to the reduction of the rhenium-oxygen complex.

In yet another embodiment, the present invention involves a novel superactive catalytic composite comprising a combination of an adsorbed rhenium-oxygen complex with a porous carrier material containing a halogen component, a platinum group component and a conventional rhenium component; wherein the platinum group component is uniformly dispersed in the carrier material in the elemental metallic state during the adsorption and reduction of the rhenium-oxygen complex; wherein these components are present in amounts sufficient to result in the composite containing, calculated on an elemental basis, about 0.01 to about 2 wt. % platinum group metal, about 0.01 to about 2 wt. % rhenium derived from the conventional rhenium component, about 0.1 to about 3.5 wt. % halogen, and about 0.01 to about 5 wt. % rhenium derived from the adsorbed rhenium-oxygen complex; and wherein the resulting combination is subjected to reduction conditions selected to reduce the absorbed rhenium oxygen-complex to rhenium metal without agglomerating the platinum group component.

In still another embodiment, the present invention comprises any of the catalytic composites defined in the previous embodiments wherein the porous carrier material contains, prior to the addition of the adsorbed rhenium-oxygen complex, a catalytically effective amount of a component selected from the group consisting of tin, lead, germanium, cobalt, nickel, iron, tungsten, chromium, molybdenum, bismuth, indium, gallium, cadmium, zirconium, manganese, zinc, uranium, copper, silver, gold, tantalum, one or more of the rare earth metals and mixtures thereof.

In another aspect, the invention is defined as a superactive catalytic composite comprising the dried and reduced reaction product formed by reacting a catalytically effective amount of a rhenium-oxygen complex with a porous carrier material containing a catalytically effective amount of a conventional rhenium component and a uniform dispersion of a catalytically effective amount of a platinum group component maintained in the elemental metallic state reaction at conditions selected to result in the adsorption of at least a portion of the rhenium-oxygen complex on the surface of the platinum group metal, and thereafter subjecting the resulting reaction product to drying and reduction conditions selected to reduce the adsorbed rhenium-oxygen complex to the elemental metallic state without agglomerating the platinum group component.

A concomitant embodiment of the present invention involves a method of preparing any of the catalytic composites defined in the previous embodiments, the method comprising the steps of: (a) reacting a solution containing a rhenium-oxygen complex with a porous carrier material containing a conventional rhenium component and a uniform dispersion of a platinum group component maintained in the elemental metallic state at reaction conditions selected to result in at least a portion of the rhenium-oxygen complex being adsorbed on the surface of the platinum group metal; (b) subjecting the resulting reaction product to drying conditions selected to vaporize the solvent without agglomerating the platinum group component; and thereafter (c) treating the resulting dried reaction product with a dry hydrogen stream at reduction conditions selected to reduce substantially all of the adsorbed rhenium-oxygen complex to the elemental metallic state.

A further embodiment involves a process for the conversion of a hydrocarbon which comprises contacting the hydrocarbon and hydrogen with the superactive catalytic composite defined in any of the previous embodiments at hydrocarbon conversion conditions.

A highly preferred embodiment comprehends a process for reforming a gasoline fraction which comprises contacting the gasoline fraction and hydrogen with the superactive multimetallic catalytic composites defined in any one of the prior embodiments at reforming conditions selected to produce a high octane reformate.

An especially preferred embodiment is a process for the production of aromatic hydrocarbons which comprises contacting a hydrocarbon fraction rich in aromatic precursors and hydrogen with the superactive multimetallic catalytic composite defined in any one of the prior embodiments at aromatic production conditions selected to produce an effluent stream rich in aromatic hydrocarbons.

Other objects and embodiments of the present invention relate to additional details regarding the essential and preferred catalytic ingredients, preferred amounts of ingredients, appropriate methods of catalyst preparation, operating conditions for use with the novel catalyst in the various hydrocarbon conversion processes in which it has utility, and the like particulars, which are hereinafter given in the following detailed discussion of each of the essential and preferred features of the present invention.

Considering first the porous carrier material utilized in the present invention, it is preferred that the material be a porous, adsorptive, high surface area support having a surface area of about 25 to about 500 m$^2$/g. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as (1) activated carbon, coke, or charcoal; (2) silica or silica gel, silcon carbide, clays, and silicates including those synthetically prepared and naturally occurring, which may or may not be acid treated for example, attapulgus clay, china clay, diatomaceous earth, fuller's earth, kaolin, kieselguhr, etc., (3) ceramics, porcelain, crushed firebrick, bauxite, (4) refractory inorganic oxides such as alumina, titanium dioxide, zirconium dioxide, chromium oxide, berryllium oxide, vanadium oxide, cesium oxide, hafnium oxide, zinc oxide, magnesia, boria, thoria, silica-alumina, silica-magnesia, chromia-alumina, alumina-boria, silica-zirconia, etc.; (5) crystalline zeolitic aluminosilicates such as naturally occurring or synthetically prepared mordenite and/or faujasite, either in the hydrogen form or in a form which has been treated with multivalent cations; (6) spinels such as $MgAl_2O_4$, $FeAL_2O_4$, $ZnAl_2O_4$, $CaAl_2O_4$, and other like compounds having the formula $MO-Al_2O_3$ where M is a metal having a valence of 2; and (7) combinations of elements from one or more of these groups. The preferred porous carrier materials for use in the present invention are refractory inorganic oxides, with best results obtained with an alumina carrier material. Suitable alumina materials are the crystalline aluminas known as gamma-, eta-, and theta-alumina, with gamma- or eta-alumina giving best results. In addition, in some embodiments the alumina carrier material may contain minor proportions of other well known refractory inorganic oxides such as silica, zironia, magnesia, etc.; however, the preferred support is substantially pure gamma- or eta-alumina. Preferred carrier materials have an apparent bulk density of about 0.3 to about 0.8 g/cc and surface area characteristics such that the average pore diameter is about 20 to 300 Angstroms, the pore volume is about 0.1 to about 1 cc/g and the surface area is about 100 to about 500 m$^2$/g. In general, best results are typically obtained with a gamma-alumina carrier material which is used in the form of spherical particles having: a relatively small diameter (i.e. typically about 1/16 inch), an apparent bulk density of about 0.3 to about 0.8 g/cc. a pore volume of about 0.4 ml/g. and a surface area of about 150 to about 250 m$^2$/g.

The preferred alumina carrier material may be prepared in any suitable manner and may be synthetically prepared or natural occurring. Whatever type of alumina is employed, it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide, to a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, tablets, etc., and utilized in any desired size. For the purpose of the present invention a particularly preferred form of alumina is the sphere, and alumina spheres may be continuously manufactured by the well known oil drop method which comprises: forming an alumina hydrosol by any of the techniques taught in the art and preferably by reacting aluminum metal with hydrochloric acid, combining the resultant hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 350° F. so about 1300° F. for a period of about 1 to about 20 hours. This treatment effects conversion of the alumina hydrogel to the corresponding crystalline gamma-alumina. See the teachings of U.S. Pat. No. 2,620,314 for additional details.

Another particularly preferred alumina carrier material is synthesized from a unique crystalline alumina powder which has been characterized in U.S. Pat. Nos. 3,852,190 and 4,012,313 as a byproduct from a Ziegler higher alcohol synthesis reaction as described in Ziegler's U.S. Pat. No. 2,892,858. For purposes of simplification, the name "Ziegler alumina" is used herein to identify this material. It is presently available from the Conoco Chemical Division of Continental Oil Company under the trademark Catapal. This material is an extremely high purity alpha-alumina monohydrate (boehmite) which after calcination at a high temperature has been shown to yield a high purity gamma-alumina. It is commercially available in three forms: (1) Catapal SB—a spray dried powder having a typical surface area of 250 m$^2$/g; (2) Catapal NG—a rotary kiln dried alumina having a typical surface area of 180 m$^2$/g; and (3) Dispal M—a finely divided dispersable product having a typical surface area of about 185 m$^2$/g. For purposes of the present invention, the preferred starting material is the spray dried powder, Catapal SB. This alpha-alumina monohydrate powder may be formed into a suitable catalyst material according to any of the techniques known to those skilled in the catalyst carrier material forming art. Spherical carrier material particles can be formed, for example, from this Ziegler alumina by: (1) converting the alpha-alumina monohydrate powder into an alumina sol by reaction with a suitable peptizing acid and water and thereafter dropping a mixture of the resulting sol and a gelling agent into an oil bath to form spherical particles of an alumina gel which are easily converted to a gamma-alumina carrier material by known methods; (2) forming an extrudate from the powder by established methods and thereafter rolling the extrudate particles on a spinning disc until spherical particles are formed which can then be dried and calcined to form the desired particles of spherical carrier material; and (3) wetting the powder with a suitable peptizing agent and thereafter rolling particles of the powder into spherical masses of the desired size in much the same way that children have been known to make parts of snowmen by rolling snowballs down hills covered with wet snow. This alumina powder can also be formed in any other desired shape or type of carrier material known to those skilled in the art such as rods, pills, pellets, tablets, granules, extrudates and the like forms by methods well known to the practitioners of the catalyst carrier material forming art. The preferred type of carrier material for the present invention is a cylindrical extrudate having a diameter of about 1/32" to about ⅛" (especially about 1/16") and a length to diameter (L/D) ratio of about 1:1 to about 5:1, with an L/D ratio of about 2:1 being especially preferred. The especially preferred extrudate form of the carrier material is preferably prepared by mixing the alumina powder with water and a suitable peptizing agent such as nitric acid, acetic acid, aluminum nitrate and the like material until an extrudable dough is formed. The amount of water added to form the dough is typically sufficient to give a loss on ignition (LOI) at 500° C. of about 45 to 65 wt. %, with a value of about 56 wt. % being especially preferred. On the other hand, the acid addition rate is generally sufficient to provide about 2 to 7 wt. % of the volatile free alumina powder used in the mix, with a value of about 3 to 4% being especially preferred. The resulting dough is then extruded through a suitably sized die to form extrudate particles. These particles are then dried at a temperature of about 500° to 800° F. for a period of about 0.1 to about 5 hours and thereafter calcined at a temperature of about 900° F. to about 1500° F. for a period of about 0.5 to about 5 hours to form the preferred extrudate particles of the Ziegler alumina carrier material. In addition, in some embodiments of the present invention the Ziegler alumina carrier material may contain minor proportions of other well known refractory inorganic oxides such as silica, titanium dioxide, zirconium dioxide, chromium oxide, beryllium oxide, vanadium oxide, cesium oxide, hafnium oxide, zinc oxide, iron oxide, cobalt oxide, magnesia, boria, thoria, and the like materials which can be blended into the extrudable dough prior to the extrusion of same. In the same manner crystalline zeolitic aluminosilicates such as naturally occurring or synthetically prepared mordenite and/or faujasite, either in the hydrogen form or in a form which has been treated with a multivalent cation, such as a rear earth, can be incorporated into this carrier material by blending finely divided particles of same into the extrudable dough prior to extrusion of same. A preferred carrier material of this type is substantially pure Ziegler alumina having an apparent bulk density (ABD) of about 0.6 to 1 g/cc (especially an ABD of about 0.7 to about 0.85 g/cc), a surface area of about 150 to about 280 m$^2$/g (preferably about 185 to about 235 m$^2$/g), and a pore volume of about 0.3 to about 0.8 cc/g.

A first essential ingredient of the subject catalyst is the platinum group component. That is, it is intended to cover the use of platinum, iridium, osmium, ruthenium, rhodium, palladium, or mixtures thereof as a first component of the superactive catalytic composite. It is an essential feature of the present invention that substantially all of this platinum group component is uniformly dispersed throughout the porous carrier material in the elemental metallic state during the incorporation of the rhenium-oxygen complex. Generally, the amount of this component present in the form of catalytic composites is small and typically will comprise about 0.01 to about 2 wt. % of final catalytic composite, calculated on an elemental basis. Excellent results are obtained when the catalyst contains about 0.05 to about 1 wt. % of platinum, iridium, rhodium or palladium metal. Particularly preferred mixtures of these platinum group metals suitable for use in the composite of the present invention are: (1) platinum and iridium and (2) platinum and rhodium.

This platinum group component may be incorporated in the porous carrier material in any suitable manner known to result in a relatively uniform distribution of this component in the carrier material such as coprecipitation or cogelation, coextrusion, ion-exchange or impregnation. The preferred method of preparing the catalyst involves the utilization of a soluble, decomposable compound of platinum group metal to impregnate the carrier material in a relatively uniform manner. For example, this component may be added to the support by commingling the latter with an aqueous solution of chloroplatinic or chloroiridic or chloropalladic acid. Other water-soluble compounds or complexes of platinum group metals may be employed in impregnation solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, palladium nitrate, palladium sulfate, diaminepalladium (II) hydroxide, tetraminepalladium (II) chloride, hexaminerhodium chloride, rhodium carbonylchloride, rhodium trichloride hydrate, rhodium nitrate, sodium hexachlororhodate (III), sodium hexanitrorhodate (III), iridium tribromide, iridium dichloride, iridium tetrachloride, sodium hexanitroiridate (III), potassium or sodium chloroiridate, potassium rhodium oxalate, etc. The utilization of a platinum, iridium, rhodium, or palladium chloride compound, such as chloroplatinic, chloroiridic or chloropalladic acid or rhodium trichloride hydrate, is preferred since it facilitates the incorporation of both the platinum group component and at least a minor quantity of the preferred halogen component in a single step. Hydrogen chloride or the like acid is also generally added to the impregnation solution in order to further facilitate the incorporation of the halogen component and the uniform distribution of this metallic component throughout the carrier material. In addition, it is generally preferred to impregnate the carrier material after it has been calcined in order to minimize the risk of washing away the valuable platinum group compound.

A second essential ingredient of the present catalytic composite is a conventional rhenium component. It is preferred that a substantial portion of this conventional rhenium component exist within the catalytic composite of the present invention during the incorporation of the rhenium-oxygen complex in the elemental metallic state or in a state which is reducible to the elemental metallic state under hydrocarbon conversion conditions or in a mixture of these states. This conventional rhenium component may be utilized in the composite in any amount which is catalytically effective, with the preferred amount being about 0.01 to about 2 wt. % thereof, calculated on an elmental basis. Typically, best results are obtained with about 0.05 to about 1 wt. % rhenium. It is additionally preferred to select the specified amount of the conventional rhenium component from within this broad weight range as a function of the amount of the platinum group component, on an atomic basis, so that the atomic ratio of conventional rhenium to platinum group metal is about 0.1:1 to about 5:1.

This conventional rhenium component may be incorporated into the carrier material in any suitable manner known to those skilled in the catalyst formulation art which results in a relatively uniform distribution of rhenium in the carrier material such as by coprecipitation, ion-exchange, coextrusion, or impregnation. It is of course essential that this component is added to the carrier material prior to the addition of the rhenium-oxygen complex and prior to the oxidation and reduction of the platinum group component. Best results are obtained when the conventional rhenium component is relatively uniformly distributed throughout the carrier material in a relatively small particle size, and the preferred procedures are the ones known to result in a composite having this relatively uniform distribution. One acceptable procedure for incorporating this component into the composite involves cogelling or coprecipitating or coextruding this rhenium component during the preparation of the preferred carrier material, alumina. This procedure usually comprehends the addition of a soluble, decomposable compound of rhenium such as perrhenic acid or a salt thereof to the alumina hydrosol before it is gelled. The resulting mixture is then finished by conventional gelling, aging, drying, and calcination steps as explained hereinbefore. A preferred way of incorporating this component is an impregnation step wherein the porous carrier material is impregnated with a suitable rhenium-containing solution either before, during, or after the carrier material is calcined. Preferred impregnation solutions are aqueous solutions of water soluble, decomposable rhenium compounds such as ammonium perrhenate, sodium perrhenate, potassium perrhenate, potassium rhenium oxychloride ($K_2ReOCl_5$), potassium hexachlororhenate (IV), rhenium chloride, rhenium heptoxide, and the like compounds. Best results are ordinarily obtained when the impregnation solution is an aqueous solution of perrhenic acid. This component can be added to the carrier material either prior to, simultaneously with, or after the platinum group component is combined therewith. Best results are usually achieved when this component is added simultaneously with the platinum group component.

It is especially preferred to incorporate a halogen component into the porous carrier material prior to the reaction thereof with the rhenium-oxygen complex.

Although the precise form of the chemistry of the association of the halogen component with the carrier material is not entirely known, it is customary in the art to refer to the halogen component as being combined with the carrier material, or with the platinum group and/or conventional rhenium component in the form of the halide (e.g. as the chloride). This combined halogen may be either fluorine, chlorine, iodine, bromine, or mixtures thereof. Of these, fluorine and, particularly, chlorine are preferred for the purposes of the present invention. The halogen may be added to the carrier material in any suitable manner, either during preparation of the support or before, during or after the addition of the platinum group and conventional rhenium components. For example, the halogen may be added, at any stage of the preparation of the carrier material or to the calcined carrier material, as an aqueous solution of a suitable, decomposable halogen-containing compound such as hydrogen fluoride, hydrogen chloride, hydrogen bromide, ammonium chloride, etc. The halogen component or a portion thereof, may be combined with the carrier material during the impregnation of the latter with the platinum group component; for example, through the utilization of a mixture of chloroplatinic acid and hydrogen chloride. In another situation, the alumina hydrosol which is typically utilized to form a preferred alumina carrier material may contain halogen and thus contribute at least a portion of the halogen component to the final composite. For reforming, the halogen will be typically combined with the carrier material in an amount sufficient to result in a final composite that contains about 0.1 to about 3.5%, and preferably about 0.5 to about 1.5%, by weight of halogen, calculated on an elemental basis. In isomerization or hydrocracking embodiments, it is generally preferred to utilize relatively larger amounts of halogen in the catalyst—typically, ranging up to about 10 wt. % halogen calculated on an elemental basis, and more preferably, about 1 to about 5 wt. %. It is to be understood that the specified level of halogen component in the instant superactive catalyst can be achieved or maintained during use in the conversion of hydrocarbons by continously or periodically adding to the reaction zone a decomposable halogen-containing compound such as an organic chloride (e.g. ethylene dichloride, carbon tetrachloride, t-butyl chloride) in an amount of about 1 to 100 wt. ppm. of the hydrocarbon feed, and preferably about 1 to 10 wt. ppm.

After the platinum group and conventional rhenium components are combined with the porous carrier material, the resulting carrier material will generally be dried at a temperature of about 200° F. to about 600° F. for a period of typically about 1 to about 24 hours or more and thereafter oxidized at a temperature of about 700° F. to about 1100° F. in an air or oxygen atmosphere for a period of about 0.5 to about 10 or more hours selected to convert substantially all of the platinum group and conventional rhenium component to the corresponding oxides. When the preferred halogen component is utilized in the present composition, best results are generally obtained when the halogen content of this carrier material is adjusted during at least a portion of this oxidation step by including a halogen or a halogen-containing compound in the air or oxygen atmosphere utilized. For purposes of the present invention, the particularly preferred halogen is chlorine and it is highly recommended that the halogen compound utilized in this halogenation step be either hydrochloric acid or a hydrochloric acid-producing substance. In particular, when the halogen component of the catalyst is chlorine, it is preferred to use a molar ratio of $H_2O$ to HCl of about 5:1 to about 100:1 during at least a portion of this oxidation step in order to adjust the final chlorine content of the catalyst to a range of about 0.1 to about 3.5 wt. %. Preferably, the duration of this halogenation step is about 1 to 5 or more hours.

One crucial feature of the present invention involves subjecting the resulting oxidized, and typically halogen-treated, carrier material to a substantially water-free reduction step before the incorporation of the rhenium-oxygen complex pursuant to the present invention. The importance of this reduction step comes from my observation that when an attempt is made to prepare the instant catalytic composite without first reducing the platinum group component, no significant improvement in the platinum-rhenium catalyst system is obtained. Put another way, it is my finding that it is essential for the platinum group component to be well dispersed in the porous carrier material in the elemental metallic state prior to incorporation of the rhenium-oxygen complex by the unique procedure of the present invention in order for synergistic interaction of the rhenium-oxygen complex with the dispersed platinum group component to occur according to the theories that I have previously explained. Accordingly, this reduction step is designed to reduce substantially all of the platinum group component to the elemental metallic state and to assure a relatively uniform and finely divided dispersion of this metallic component throughout the porous carrier material. Preferably a substantially pure and dry hydrogen stream (by the use of the word "dry" I mean that it contains less than 20 vol. ppm. water, preferably less than 5 vol. ppm. water and most preferably less than 1 vol. ppm. water) is used as the reducing agent in this step. The reducing agent is contacted with the oxidized, platinum group metal-containing carrier material at conditions including a reduction temperature of about 450° F. to about 1200° F., a gas hourly space velocity (GHSV) sufficient to rapidly dissipate any local concentrations of water formed during the reduction of the platinum group oxide, and a period of about 0.5 to about 10 or more hours selected to reduce substantially all of the platinum group component to the elemental metallic state. Once this condition of finely divided dispersed platinum group metal in the porous carrier material is achieved, it is important that environments and/or conditions that could disturb or change this condition be avoided; specifically, I much prefer to maintain the freshly reduced carrier material containing the platinum group and conventional rhenium components under a blanket of inert gas to avoid any possibility of contamination of same either by water or by oxygen.

A third essential ingredient of the present superactive catalytic composite is a novel rhenium component which I have chosen to characterize as an adsorbed rhenium-oxygen complex in order to emphasize that the rhenium moiety or site of interest in my invention is the rhenium site produced by reducing an adsorbed rhenium-oxygen complex in the presence of a finely divided dispersion of a platinum group metal and in the absence of materials such as oxygen or sulfur which could interfere with the basic desired interaction of the rhenium-oxygen complex with the uniformly dispersed platinum group metal sites as previously explained. The rhenium-oxygen complex that can be used to interact with the platinum group metal sites according to my invention is not to be limited to rhenium oxide per se but is intended to include all rhenium-oxygen complexes that have a sufficient number of oxygen ligands to enable them to be more strongly attracted to platinum group metal sites on the surface of the carrier material rather than to acidic sites on the surface of the carrier material. Thus the use of perrhenic acid, rhenium oxyhalide complexes and salts thereof are intended to be included within the scope of the term "rhenium-oxygen complex". This rhenium-oxygen complex may be utilized in the resulting composite in any amount that is catalytically effective with the preferred amount typically corresponding to about 0.01 to about 5 wt. % thereof, calculated on an elemental rhenium basis. Best results are ordinarily obtained with about 0.05 to about 1 wt. % rhenium, derived from the rhenium-oxygen complex. The traditional rule for rhenium-platinum catalyst system is that best results are achieved when the amount of the rhenium component is set as a function of the amount of the platinum group component also hold for the rhenium sites derived from the adsorbed rhenium-oxygen complex; specifically, I find that best results with a rhenium to platinum group metal atomic ratio of about 0.1:1 to about 5:1, with an especially useful range comprising about 0.2:1 to about 3:1, wherein the rhenium is in all cases limited to that derived from the adsorbed rhenium-oxygen complex. Another significant parameter for the catalyst of the present invention is the ratio of rhenium derived from the rhenium-oxygen complex to rhenium derived from the conventional rhenium component; typically, this parameter is set at about 0.5:1 to about 2:1, with best results obtained at about 1:1.

The rhenium-oxygen complex may be reacted with the reduced porous carrier material containing the platinum group and rhenium components in any suitable manner known to those skilled in the catalyst formulation art which results in relatively good contact between the rhenium-oxygen complex and the platinum group component contained in the porous carrier material. One acceptable procedure for incorporating the rhenium-oxygen complex into the composite involves sublimating the rhenium-oxygen complex under conditions which enable it to pass into the vapor phase without being decomposed and thereafter contacting the resulting rhenium-oxygen sublimate with the platinum group metal-containing porous carrier material under conditions designed to achieve intimate contact of the rhenium-oxygen complex with the platinum group metal dispersed on the carrier material. Typically this procedure is performed under vacuum at a temperature of about 70° to about 500° F. for a period of time sufficient to react the desired amount of rhenium-oxygen complex with the carrier material. In some cases an inert carrier gas such as nitrogen can be admixed with the rhenium-oxygen sublimate in order to facilitate the intimate contacting of same with the platinum-loaded porous carrier material. A particular preferred way of accomplishing this rhenium-oxygen complex reaction step is an impregnation procedure wherein the platinum-loaded porous carrier material is impregnated with a suitable solution containing the desired quantity of the rhenium-oxygen complex. For purposes of the present invention, aqueous solutions are preferred, although any suitable solution may be utilized as long as it does not detrimentally interact with the rhenium-oxygen complex, the platinum group and conventional rhenium components or the carrier material. If an organic solvent is used, the organic solution is preferably anhydrous in order to minimize the possibility of detrimental interaction of water with the platinum group metal. Suitable organic solvents are any of the commonly available organic solvents such as one of the available ethers, alcohols, ketones, aldehydes, paraffins, naphthenes and aromatic hydrocarbons, for example, acetone, acetyl acetone, benzaldehyde, pentane, hexane, carbon tetrachloride, methyl isopropyl ketone, benzene, n-butylether, diethyl ether, ethylene glycol, methyl isobutyl ketone, diisobutyl ketone and the like organic solvents. Best results are ordinarily obtained when the solvent is water or acetone; consequently, the preferred impregnation solution is rhenium oxide dissolved in water or acetone. The rhenium-oxygen complex suitable for use in the impregnation solution may be either the pure rhenium oxide itself (e.g. $Re_2O_7$) or perrhenic acid or a salt of perrhenic acid such as ammonium perrhenate, sodium perrhenate, potassium perrhenate, etc., or a rhenium oxyhalide or a salt thereof. Best results are ordinarily obtained in this impregnation procedure when the rhenium-oxygen complex is rhenium oxide or perrhenic acid.

After the preferred impregnation procedure is used to react the rhenium-oxygen complex with the carrier material containing the uniformly dispersed platinum group metal, it is a key feature of the present invention that the solvent used in the impregnation step is very carefully vaporized from the resulting reaction product under conditions that are specifically chosen to avoid agglomerating the platinum group metal. The principal reason for performing this drying step carefully is my finding that less than thorough drying before the adsorbed rhenium-oxygen complex reduction step can under certain circumstances detrimentally affect the activity-stability and $C_5+$ selectivity of the resulting platinum-rhenium catalyst system. I attribute this instability to platinum agglomerization caused by the release of adsorbed water from the carrier material during the reduction step. In order to avoid interference with the uniform dispersion of the platinum group metal, it is preferred to perform this drying step in stepwise fashion prior to this reduction step with a view towards preventing any water source other than that produced from reduction of the rhenium-oxygen complex from contributing free water to the local environment of the catalyst particles in this reduction step. Consequently, it is important that the major amount of the solvent be first removed from the impregnated particles at a relatively low temperature of about 100° F. to about 250° F. in the presence of a flowing inert gas or under vacuum conditions until substantially no further amounts of solvent is observed to come off the impregnated particles at these conditions. When the solvent is water, the partially dried particles are preferably subjected to a further drying step at conditions including a temperature greater than or equal to the temperature used during the subsequent reduction step with a flowing inert gas stream such as nitrogen or a suitable noble gas for a period of time lasting until no further evolution of solvent from the catalyst particles is noted. Typically the drying conditions used in this second drying step are: a temperature of about 300° to about 900° F. (preferably about 400° to 750° F.), a GHSV of about 100 to about 1500 or more $hr.^{-1}$ and a time period of 0.25 to about 5 or more hours.

Following this drying step, the resulting dried catalyst particles are subjected to a substantially water-free reduction step designed to reduce substantially all of the adsorbed rhenium-oxygen complex to the elemental metallic state without agglomerating the platinum group component. Preferably a substantially pure (i.e. hydrocarbon-free) and dry hydrogen or a hydrogen-containing inert gas stream is used as the reducing agent in this step. The meaning of the word "dry" has been previously defined in conjunction with the discussion of the reduction step that follows incorporation of the platinum group metal. The reduction conditions used in this step are: (1) a temperature of about 200° to about 900° F., and preferably about 400° to 750° F.; a GHSV sufficient to rapidly dissipate any local concentrations of water formed during the reduction of the adsorbed rhenium-oxygen complex and typically about 250 to about 1500 or more nr.$^{-1}$, and a reduction time of about 0.5 to about 5 or more hours. After the adsorbed rhenium-oxygen complex has been reduced, it is a much preferred practice to maintain the resulting reduced catalytic composite in an inert environment (i.e. a nitrogen or the like inert gas blanket) until the catalyst is loaded into a reaction zone for use in the conversion of hydrocarbons.

The resulting reduced catalytic composite may, in some cases, be beneficially subjected to a presulfiding step designed to incorporate in the catalytic composite from about 0.01 to about 1 wt. % sulfur calculated on an elemental basis. Preferably, this presulfiding treatment takes place in the presence of hydrogen or nitrogen and a suitable decomposable sulfur-containing compound such as hydrogen sulfide, lower molecular weight mercaptans, organic sulfides, etc. Typically, this procedure comprises treating the reduced catalyst with a sulfiding gas such as a mixture of hydrogen or nitrogen and hydrogen sulfide containing about 0.01 to about 0.1 moles of hydrogen sulfide per mole of hydrogen or nitrogen at sulfiding conditions sufficient to effect the desired incorporation of sulfur, generally including a temperature ranging from about 50° F. up to about 1000° F. It is generally a preferred practice to perform this presulfiding step under substantially water-free and oxygen-free conditions. It is within the scope of the present invention to maintain or achieve the sulfided state of the present catalyst during use in the conversion of hydrocarbons by continuously or periodically adding a decomposable sulfur-containing compound, selected from the above mentioned hereinbefore, to the reactor containing the superactive catalyst in an amount sufficient to provide about 1 to 500 wt. ppm., preferably about 1 to about 20 wt. ppm. of sulfur, based on hydrocarbon charge. According to another mode of operation, this sulfiding step may be accomplished during the reduction step by utilizing a rhenium-oxygen complex which has a sulfur-containing ligand or by adding H$_2$S to the hydrogen stream which is preferably used therein.

In embodiments of the present invention wherein the instant superactive multimetallic catalytic composite is used for the dehydrogenation of dehydrogenatable hydrocarbons or for the hydrogenation of hydrogenatable hydrocarbons, it is ordinarily a preferred practice to include an alkali or alkaline earth metal component in the composite before addition of the rhenium-oxygen complex and to minimize or eliminate the preferred halogen component. More precisely, this optional ingredient is selected from the group consisting of the compounds of the alkali metals—cesium, rubidium, potassium, sodium, and lithium—and the compounds of the alkaline earth metals—calcium, strontium, barium, and magnesium. Generally, good results are obtained in these embodiments when this component constitutes about 0.1 to about 5 wt. % of the composite, calculated on an elemental basis. This optional alkali or alkaline earth metal component can be incorporated into the composite in any of the known ways, with impregnation with an aqueous solution of a suitable water-soluble, decomposable compound being preferred.

Another optional ingredient for the superactive multimetallic catalyst of the present invention is a Friedel-Crafts metal halide component. This ingredient is particularly useful in hydrocarbon conversion embodiments of the present invention wherein it is preferred that the catalyst utilized has a strong acid or cracking function associated therewith—for example, an embodiment wherein the hydrocarbons are to be hydrocracked or isomerized with the catalyst of the present invention. Suitable metal halides of the Friedel-Crafts type include aluminum chloride, aluminum bromide, ferric chloride, ferric bromide, zinc chloride, and the like compounds, with the aluminum halides and particularly aluminum chloride ordinarily yielding best results. Generally, this optional ingredient can be incorporated into the composite of the present invention by any of the conventional methods for adding metallic halides of this type and either prior to or after the rhenium-oxygen complex is added thereto; however, best results are ordinarily obtained when the metallic halide is sublimed onto the surface of the carrier material after the rhenium-oxygen complex is added thereto according to the preferred method disclosed in U.S. Pat. No. 2,999,074. The component can generally be utilized in any amount which is catalytically effective, with a value selected from the range of about 1 to about 100 wt. % of the carrier material generally being preferred.

According to the present invention, a hydrocarbon charge stock and hydrogen are contacted with the instant superactive reduced multimetallic catalyst in a hydrocarbon conversion zone. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use either a fixed bed system or a dense-phase moving bed system such as is shown in U.S. Pat. No. 3,725,249. It is also contemplated that the contacting step can be performed in the presence of a physical mixture of particles of the catalyst of the present invention and particles of a conventional dual-function catalyst of the prior art. In a fixed bed system, a hydrogen-rich gas and the charge stock are preheated by any suitable heating means to the desired reaction temperature and then are passed into a conversion zone containing a fixed bed of the superactive multimetallic catalyst. It is, of course, understood that the conversion zone may be one or more separate reactors with suitable means therebetween to ensure that the desired conversion temperature is maintained at the entrance to each reactor. It is also important to note that the reactants may be contacted with the catalyst bed in either upward, downward, or radial flow fashion with the latter being preferred. In addition, the reactants may be in the liquid phase, a mixed liquid-vapor phase, or a vapor phase when they contact the catalyst, with best results obtained in the vapor phase.

In the case where the superactive multimetallic catalyst of the present invention is used in a reforming operation, the reforming system will typically comprise a reforming zone containing one or more fixed beds or dense-phase moving beds of the catalysts. In a multiple bed system, it is, of course, within the scope of the present invention to use the present catalyst in less than all of the beds with a conventional dual-function catalyst being used in the remainder of the beds. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in some cases aromatics and/or olefins may also be present. This preferred class includes straight run gasolines, natural gasolines, synthetic gasolines, partially reformed gasolines, and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha—for example, a naptha boiling in the range of $C_7$ to 400° F. In some cases, it is also advantageous to charge pure hydrocarbons or mixtures of hydrocarbons that have been extracted from hydrocarbon distillates—for example, straight-chain paraffins—which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous, and water-yielding contaminants therefrom and to saturate any olefins that may be contained therein.

In other hydrocarbon conversion embodiments, the charge stock will be of the conventional type customarily used for the particular kind of hydrocarbon conversion being effected. For example, in a typical isomerization embodiment, the charge stock can be a paraffinic stock rich in $C_4$ to $C_8$ normal paraffins, or a normal butane-rich stock, or an n-hexane-rich stock, or a mixture of xylene isomers, or an olefin-containing stock, etc. In a dehydrogenation embodiment, the charge stock can be any of the known dehydrogenatable hydrocarbons such as an aliphatic compound containing 2 to 30 carbon atoms per molecule, a $C_4$ to $C_{30}$ normal paraffin, a $C_8$ to $C_{12}$ alkylaromatic, a naphthene, and the like. In hydrocracking embodiments, the charge stock will be typically a gas oil, heavy cracked cycle oil, etc. In addition, alkylaromatics, olefins, and naphthenes can be conveniently isomerized by using the catalyst of the present invention. Likewise, pure hydrocarbons or substantially pure hydrocarbons can be converted to more valuable products by using the acidic multimetallic catalyst of the present invention in any of the hydrocarbon conversion processes, known to the art, that use a dual-function catalyst.

In a reforming embodiment, it is generally preferred to utilize the instant multimetallic catalytic composite in a substantially water-free environment. Essential to the achievement of this condition in the reforming zone is the control of the water level present in the charge stock and the hydrogen stream which is being charged to the zone. Best results are ordinarily obtained when the total amount of water entering the conversion zone from any source is held to a level less than 50 ppm. and preferably less than 20 ppm. expressed as weight of equivalent water in the charge stock. In general, this can be accomplished by careful control of the water present in the charge stock and in the hydrogen stream. The charge stock can be dried by using any suitable drying means known to the art, such as a conventional solid adsorbent having a high selectivity for water, for instance, sodium or calcium crystalline aluminosilicates, silica gel, activated alumina, molecular sieves, anhydrous calcium sulfate, high surface area sodium, and the like adsorbents. Similarly, the water content of the charge stock may be adjusted by suitable stripping operations in a fractionation column or like device. And in some cases, a combination of adsorbent drying and distillation drying may be used advantageously to effect almost complete removal of water from the charge stock. In an especially preferred mode of operation, the charge stock is dried to a level corresponding to less than 5 wt. ppm of water equivalent. In general, it is preferred to maintain the hydrogen stream entering the hydrocarbon conversion zone at a level of about 10 vol. ppm. of water or less and most preferably about 5 vol. ppm. or less. If the water level in the hydrogen stream is too high, drying of same can be conveniently accomplished by contacting the hydrogen stream with a suitable desiccant such as those mentioned above.

In the reforming embodiment, an effluent stream is withdrawn from the reforming zone and passed through a cooling means to a separation zone, typically maintained at about 25° F. to 150° F., wherein a hydrogen-rich gas stream is separated from a high octane liquid product stream, commonly called an unstabilized reformate. When the water level in the hydrogen stream is outside the range previously specified, at least a portion of this hydrogen-rich gas stream is withdrawn from the separating zone and passed through an adsorption zone containing an adsorbent selective for water. The resultant substantially water-free hydrogen stream can then be recycled through suitable compressing means back to the reforming zone. The liquid phase from the separating zone is typically withdrawn and commonly treated in a fractionating system in order to adjust the butane concentration, thereby controlling front-end volatility of the resulting reformate.

The operating conditions utilized in the numerous hydrocarbon conversion embodiments of the present invention are in general those customarily used in the art for the particular reaction, or combination of reactions, that is to be effected. For instance, alkylaromatic, olefin, and paraffin isomerization conditions include: a temperature of about 32° F. to about 1000° F. and preferably from about 75° F. to about 500° F., a pressure of atmospheric to about 100 atmospheres, a hydrogen to hydrocarbon mole ratio of about 0.5:1 to about 20:1, and an LHSV (calculated on the basis of equivalent liquid volume of the charge stock contacted with the catalyst per hour divided by the volume of conversion zone containing catalyst and expressed in units of hr.$^{-1}$) of about 0.2 to 10. Dehydrogenation conditions include: a temperature of about 700° F. to about 1250° F., a pressure of about 0.1 to about 10 atmospheres, a liquid hourly space velocity of about 1 to 40, and a hydrogen to hydrocarbon mole ratio of about 1:1 to 20:1. Likewise, typical hydrocracking conditions include: a pressure of about 500 psig. to about 3000 psig., a temperature of about 400° F. to about 900° F., an LHSV of about 0.1 to about 10, and hydrogen circulation rates of about 1000 to 10,000 SCF per barrel of charge.

In the reforming embodiment of the present invention, the pressure utilized is selected from the range of about 0 psig. to about 1000 psig., with the preferred pressure being about 50 psig. to about 600 psig. Particularly good results are obtained at low or moderate pressure; namely, a pressure of about 100 to 450 psig. In fact, it is a singular advantage of the present invention that it allows stable operation at lower pressure than have heretofore been successfully utilized in so-called "continuous" reforming systems (i.e. reforming for periods of about 15 to about 200 or more barrels of charge per pound of catalyst without regeneration) with conventional platinum-rhenium catalyst systems. In other words, the superactive multimetallic catalyst of the present invention allowed the operation of a continuous reforming system to be conducted at lower pressure (i.e. 100 to about 350 psig.) for about the same or better catalyst cycle life before regeneration as has been heretofore realized with conventional platinum-rhenium catalysts at higher pressure (i.e. 300 to 600 psig.). On the other hand, the extraordinary activity and activity-stability characteristics of the catalyst of the present invention relative to a conventional platinum-rhenium catalyst enables reforming operations conducted at pressures of 300 to 600 psig. to achieve substantially increased catalyst cycle life before regeneration.

The temperature required for reforming with the instant catalyst is markedly lower than that required for a similar reforming operation using a high quality platinum-rhenium catalyst of the prior art. This significant and desirable feature of the present invention is a consequence of the superior activity of the superactive multimetallic catalyst of the present invention for the octane-upgrading reactions that are preferably induced in a typical reforming operation. Hence, the present invention requires a temperature in the range of from about 775° F. to about 1100° F. and preferably about 850° F. to about 1050° F. As is well known to those skilled in the continuous reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that not only is the initial temperature requirement lower, but also the rate at which the temperature is increased in order to maintain a constant octane product is for the instant catalyst system at least as good as if not better than for an equivalent operation with a high quality platinum-rhenium catalyst system of the prior art; for instance, a catalyst prepared in accordance with the teachings of U.S. Pat. No. 3,415,737. Moreover, for the catalyst of the present invention, the average $C_5+$ yield is significantly better than an equivalent operation with a high quality platinum-rhenium catalyst system of the prior art. The superior activity, selectivity and stability characteristics of the instant catalyst can be utilized in a number of highly beneficial ways to enable increased performance of a catalytic reforming process relative to that obtained in a similar operation with a platinum-rhenium catalyst of the prior art, some of these are: (1) octane number of $C_5+$ product can be increased without sacrificing average $C_5+$ yield and/or catalyst run length; (2) the duration of the process operation (i.e. catalyst run length or cycle life) before regeneration becomes necessary can be increased; (3) $C_5+$ yield can be further increased by lowering average reactor pressure with no change in catalyst run length; (4) investment costs can be lowered without any sacrifice in cycle life or in $C_5+$ yield by lowering recycle gas requirements thereby saving on capital cost for compressor capacity or by lowering initial catalyst loading requirements thereby saving on cost of catalyst and on capital cost of the reactors; (5) throughput can be increased significantly at no sacrifice in catalyst cycle life or in $C_5+$ yield if sufficient heater capacity is available.

The reforming embodiment of the present invention also typically utilizes sufficient hydrogen to provide an amount of about 1 to about 20 moles of hydrogen per mole of hydrocarbon entering the reforming zone, with excellent results being obtained when about 2 to about 6 moles of hydrogen are used per mole of hydrocarbon. Likewise, the liquid hourly space velocity (LHSV) used in reforming is selected from the range of about 0.1 to about 10, with a value in the range of about 1 to about 5 being preferred. In fact, it is a feature of the present invention that it allows operations to be conducted at higher LHSV than normally can be stably achieved in a continuous reforming process with a high quality platinum-rhenium reforming catalyst of the prior art. This last feature is of immense economic significance because it allows a continuous reforming process to operate at the same throughput level with less catalyst inventory or at greatly increased throughput level with the same catalyst inventory than that heretofore used with conventional platinum-rhenium reforming catalyst at no sacrifice in catalyst life before regeneration.

The following examples are given to illustrate further the preparation of the superactive multimetallic catalytic composite of the present invention and the use thereof in the conversion of hydrocarbons. It is understood that the examples are intended to be illustrative rather than restrictive.

EXAMPLE I

A sulfur-free Ziegler alumina carrier material cylindrical extrudate having a diameter of about 1/16 inch and a length to diameter ratio of about 2:1 to about 4:1 was prepared by: thoroughly mixing finely divided (i.e. about 10 to about 100 microns) alpha-alumina monohydrate powder (commercially available under the name of Catapal SB alumina powder) having a volatiles content of about 28 wt. % with sufficient nitric acid to provide about 3 to about 4 wt. % of nitric acid per pound of alumina powder and with sufficient water to obtain a dough having an LOI of about 50 to about 60 wt. % at 500° C., working the resulting mixture in a mechanical mixture at conditions including a temperature of about 90° to about 170° F. sufficient to form an extrudable dough, extruding the resulting dough in conventional extrusion equipment which is fitted with a die sized to result in a finished extrudate having a diameter of about 1/16 inch, drying the resulting extrudate at a temperature of about 250° to about 700° F. for about 2 hours, and finally calcining the resulting dried particles in air at a temperature of about 1200° F. for about 1½ hours to produce sulfur-free extrudate particles having a surface area of about 205 to 225 $m^2/g$ (B.E.T.) and an ABD of about 0.8 g/cc.

An aqueous impregnation solution containing chloroplatinic acid, perrhenic acid and hydrogen chloride was then prepared. The extrudate portion of the alumina carrier material was thereafter admixed with the impregnation solution. The amounts of the metallic reagent contained in this impregnation solution was calculated to result in a final composite containing, on an elemental basis, 0.15 wt. % platinum and 0.15 wt. % rhenium, derived from a conventional rhenium component. In order to insure uniform dispersion of the platinum component throughout the carrier material, the amount of hydrogen chloride used in this impregnation solution was about 4 wt. % of the alumina particles. This impregnation step was performed by adding the carrier material extrudate particles to the impregnation solution with constant agitation. In addition, the volume of the solution was approximately the same as the bulk volume of the alumina carrier material particles so that all of the particles were immersed in the impregnation solution. The impregnation mixture was maintained in contact with the carrier material particles for a period of about ½ to about 3 hours at a temperature of about 70° F. Thereafter, the temperature of the impregnation mixture was raised to about 225° F. and the excess solution was evaporated in a period of about 1 hour. The resulting dried impregnated particles were then subjected to an oxidation treatment in a dry air stream at a temperature of about 975° F. and a GHSV of about 500 hr.$^{-1}$ for about ½ hour. This oxidation step was designed to convert substantially all of the platinum and conventional rhenium components to the corresponding oxide forms. The resulting oxidized spheres were subsequently contacted in a halogen treating step with an air stream containing $H_2O$ and HCl in a mole ratio of about 30:1 for about 2 hours at 975° F. and a GHSV of about 500 hr.$^{-1}$ in order to adjust the halogen content of the catalyst particles to a value of about 1 wt. %. The halogen-treated spheres were thereafter subjected to a second oxidation step with a dry air stream at 975° F. and a GHSV of 500 hr.$^{-1}$ for an additional period of about ½ hour.

The resulting oxidized, halogen-treated carrier material particles were then subjected to a dry reduction treatment designed to reduce substantially all of the platinum component to the elemental state and to maintain a uniform dispersion of this component in the carrier material. This reduction step was accomplished by contacting the particles with a hydrocarbon-free, dry hydrogen stream containing less than 5 vol. ppm. $H_2O$ at a temperature of about 1050° F., a pressure slightly above atmospheric, a flow rate of hydrogen through the particles corresponding to a GHSV of about 400 hr.$^{-1}$ and for a period of about one hour.

A solution of perrhenic acid, $HReO_4$, in water was used as the vehicle for reacting the rhenium-oxygen complex with the carrier material containing the uniformly dispersed platinum metal. The amount of the rhenium-oxygen complex used was selected to result in a finished catalyst containing about 0.25 wt. % rhenium metal, derived from the rhenium-oxygen complex. The solution containing the rhenium-oxygen complex was then contacted under appropriate impregnation conditions with the reduced alumina carrier material particles containing platinum and conventional rhenium components resulting from the previously described reduction step. The impregnation conditions utilized were: a contact time of about one half to about three hours, a temperature of about 70° F. and a pressure of about atmospheric. Thereafter the aqueous solvent was removed in a first drying step under flowing nitrogen at a temperature of about 175° F. for a period of about one hour. The resulting partially dried impregnated particles were then subjected to a second drying step in flowing dry nitrogen. The specific drying conditions used were a temperature of about 230° F., a GHSV of about 600 hr.$^{-1}$ and a drying time of about 1.0 hours.

The resulting dried particles were subjected to a water-free reduction step with a substantially pure and dry hydrogen stream at conditions designed to reduce substantially all of the adsorbed rhenium-oxygen complex to the metallic state without agglomerating the platinum group metal component. This step involved subjecting the dried particles to a flowing dry hydrogen stream at a reduction temperature of about 575° F. for about one hour at GHSV of about 600 hr.$^{-1}$ and at atmospheric pressure. Thereafter, the reduced catalytic composite was sulfided by exposure to $H_2O$ at ambient temperatures to a level corresponding to about 0.05 wt. % sulfur, on an elemental basis. The finished catalyst was then maintained under a nitrogen blanket until it was loaded into the reactor in the subsequently described reforming test.

In summary, the resulting reduced and sulfided catalytic composite was found to contain, on an elemental basis, about 0.15 wt. % platinum, about 0.15 wt. % rhenium derived from a conventional rhenium component, about 0.25 wt. % rhenium derived from the adsorbed rhenium-oxygen complex, about 0.05 wt. % sulfur, and about 1.0 wt. % chlorine. The resulting catalyst of the present invention is hereinafter referred to as Catalyst A.

EXAMPLE II

A catalyst of the present invention, hereinafter called Catalyst B, was prepared by the procedure given in Example 1 except that the temperature of the second drying step after adsorption of the platinum-rhenium complex and the metals content of the catalyst were changed. The second drying step was performed at a temperature of 230° F. for ½ hour and then at 575° F. for ½ hour. The metals content of the catalyst was adjusted so that the catalyst contained, on an elemental basis, 0.25 wt. % platinum, 0.25 wt. % rhenium derived from a conventional rhenium component, about 0.25 wt. % rhenium derived from adsorbed rhenium-oxygen complex, about 0.05 wt. % sulfur, and about 1.0 wt. % chlorine.

EXAMPLE III

In order to compare the catalytic composites of the present invention with the platinum-rhenium catalyst system of the prior art in a manner calculated to bring out the beneficial interaction of the adsorbed rhenium-oxygen complex with the platinum component, comparison tests were made between the catalysts of the present invention, Catalysts A and B, and two control catalysts, which were bimetallic reforming catalysts of the prior art and which are similar to the catalyst exemplified in the teachings of Kluksdahl's U.S. Pat. No. 3,415,737. The control catalysts are hereinafter called Catalysts $C_1$ and $C_2$. In both cases they were a conventional combination of platinum, rhenium, sulfur and chlorine with an alumina carrier material which was prepared by co-impregnation of platinum and rhenium components using an impregnation solution containing the required amounts of chloroplatinic acid, perrhenic acid and hydrochloric acid. These control catalysts were subsequently oxidized, halogen-treated, reduced and sulfided in the same manner as Catalyst A after the platinum and conventional rhenium components were added thereto. The control catalysts contained these metals in exactly the same amounts as the catalysts of the present invention; that is, Catalyst $C_1$ contained 0.15 wt. % platinum, 0.4 wt. % rhenium, about 0.05 wt. % sulfur, and about 1.0 wt. % chlorine, and Catalyst $C_2$ contained about 0.25 wt. % platinum, about 0.5 wt. % rhenium, about 0.05 wt. % sulfur and about 1.0 wt. % chlorine. Catalysts $C_1$ and $C_2$ are thus representative of the platinum-rhenium bimetallic catalyst systems of the prior art which have all of their rhenium content derived from a conventional rhenium component.

These catalyst were then separately subjected to a high stress accelerated catalytic reforming evaluation test designed to determine in a relatively short period of time their relative activity, selectivity, and stability characteristics in a process for reforming a relatively low-octane gasoline fraction. In all tests the same charge stock was utilized and its pertinent characteristics are set forth in Table I.

This accelerated reforming test was specifically designed to determine in a very short period of time whether the catalyst being evaluated has superior characteristics for use in a high severity reforming operation.

TABLE I

| Analysis of Charge Stock | |
|---|---|
| Gravity, API at 60° F. | 59.3 |
| Distillation Profile, °F. | |
| Initial Boiling Point | 183 |
| 5% Boiling Point | 210 |
| 10% Boiling Point | 218 |
| 30% Boiling Point | 245 |
| 50% Boiling Point | 270 |
| 70% Boiling Point | 301 |
| 90% Boiling Point | 334 |
| 95% Boiling Point | 345 |
| End Boiling Point | 363 |
| Chloride, wt. ppm. | 0.6 |
| Nitrogen, wt. ppm. | 0.1 |
| Sulfur, wt. ppm. | 0.1 |
| Water, wt. ppm. | 7 |
| Octane Number, F-1 clear | 31.2 |
| Paraffins + Naphthenes, vol. % | 90.7 |
| Aromatics, vol. % | 9.3 |

Each run consisted of a series of evaluation periods of 24 hours, each of these periods comprises a 12-hour line-out period followed by a 12-hour test period during which the $C_5+$ product reformate from the plant was collected and analyzed. The test runs for the Catalysts A, B, $C_1$ and $C_2$ were performed at identical conditions which comprises a LHSV of 1.5 hr.$^{-1}$, a pressure of 300 psig., a 3.5:1 gas to oil ratio, and an inlet reactor temperature which was continuously adjusted throughout the test in order to achieve and maintain a $C_5+$ reformate target research octane of 100.

All test runs were performed in a pilot plant scale reforming unit comprising a reactor containing a fixed bed of the catalyst undergoing evaluation, a hydrogen separation zone, a debutanizer column, and suitable heating means, pumping means, condensing means, compressing means, and the like conventional equipment. The flow scheme utilized in this plant involves commingling a hydrogen recycle stream with the charge stock and heating the resulting mixture to the desired conversion temperature. The heated mixture is then passed downflow into a reactor containing the catalyst undergoing evaluation as a stationary bed. An effluent stream is then withdrawn from the bottom of the reactor, cooled to about 55° F. and passed to a gas-liquid separation zone wherein a hydrogen-rich gaseous phase separates from a liquid hydrocarbon phase. A portion of the gaseous phase is then continuously passed through a high surface area sodium scrubber and the resulting substantially water-free and sulfur-free hydrogen-containing gas stream is returned to the reactor in order to supply the hydrogen recycle stream. The excess gaseous phase from the separation zone is recovered as the hydrogen-containing product stream (commonly called "excess recycle gas"). The liquid phase from the separation zone is withdrawn therefrom and passed to a debutanizer column wherein light ends (i.e. $C_1$ to $C_4$) are taken overhead as debutanizer gas and $C_5+$ reformate stream recovered as the principal bottom product.

Figure 2:
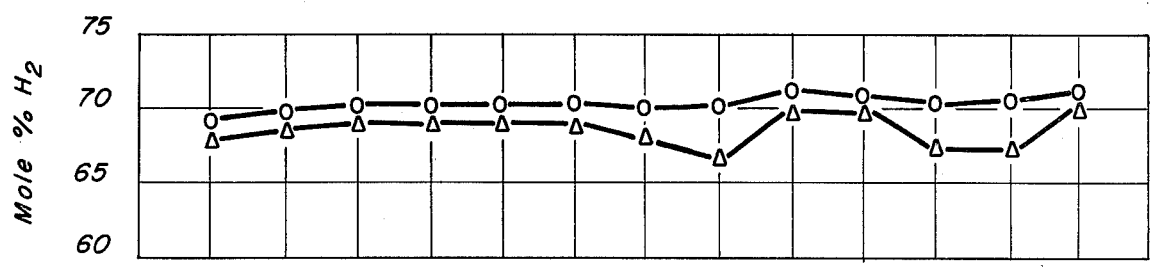
Figure 3:
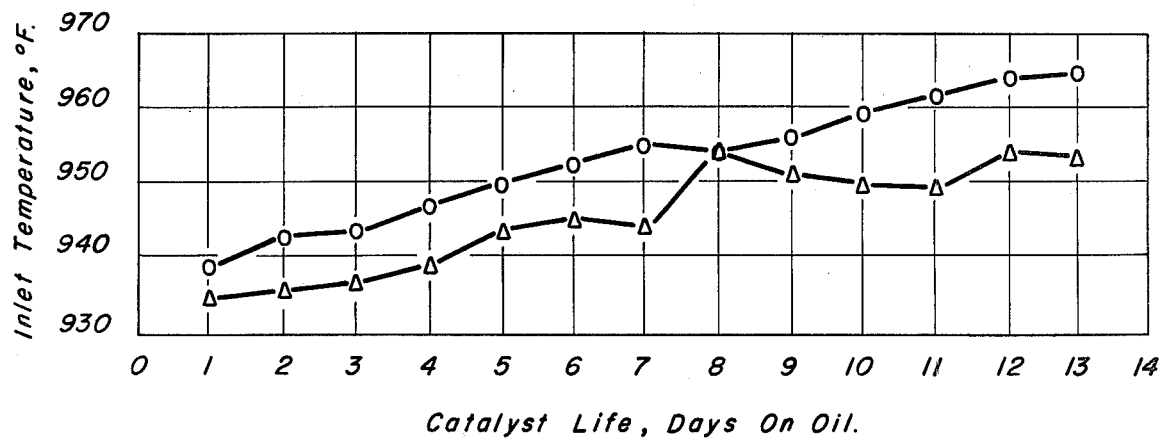
Figure 4:
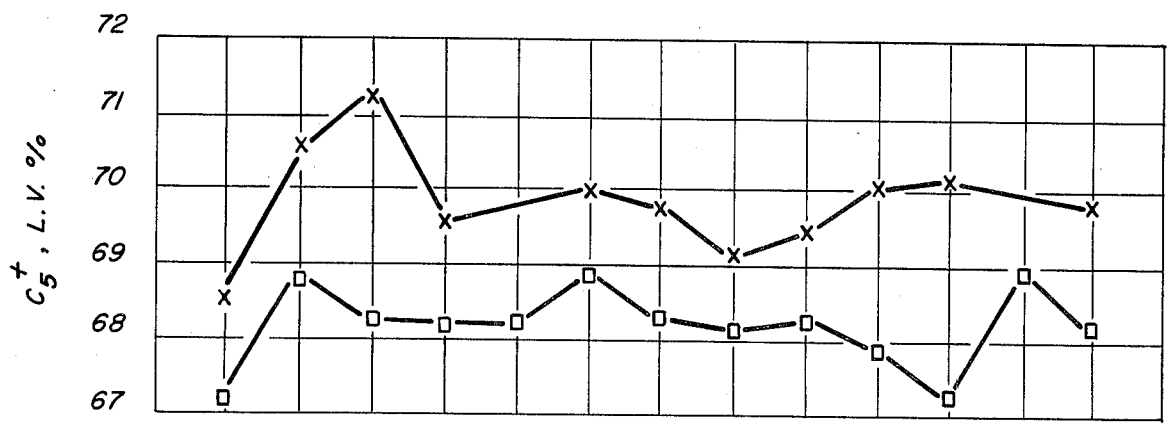
Figure 5:
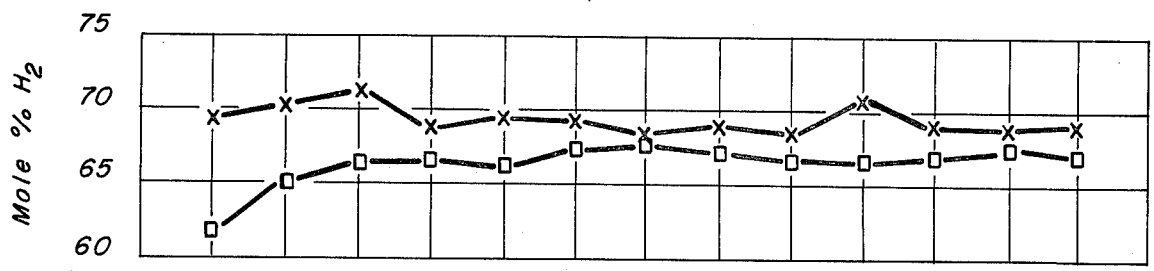

The results of the separate tests performed on the superactive catalysts of the present invention, Catalysts A and B, and the control catalysts, Catalysts $C_1$ and $C_2$, are presented in FIGS. 1, 2, 3, 4, 5 and 6 as a function of time as measured in days on oil. FIGS. 1 and 4 show graphically the relationship between $C_5+$ yields expressed as liquid volume percent (LV %) of the charge for each of the catalysts. FIGS. 2 and 5 on the other hand plots the observed hydrogen purity in mole percent of the recycle gas stream for each of the catalysts. And finally, FIGS. 3 and 6 tracks inlet reactor temperature necessary for each catalyst to achieve a target research octane number of 100.

Figure 6:
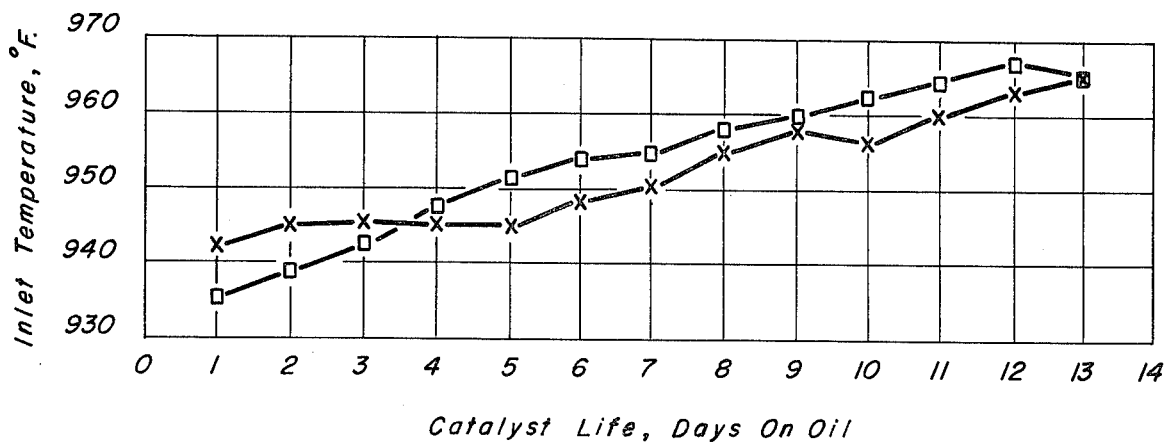

Referring now to the results of the comparison tests presented in FIGS. 1, 2 and 3 for Catalysts A and $C_1$ and in FIGS. 4, 5 and 6 for Catalysts B and $C_2$, it is immediately evident that the superactive multimetallic catalytic composites of the present invention, Catalysts A and B, substantially outperformed the conventional platinum-rhenium control catalysts in the areas of activity, with at least equivalent activity-stability. Turning to FIG. 1 it can be ascertained that the average $C_5+$ selectivity for Catalyst A was significantly above that exhibited for Catalyst $C_1$ with similar yield stability. This increase in $C_5+$ selectivity is even more dramatically illustrated in FIG. 4 where the $C_5+$ yield for Catalysts B and $C_2$ are compared. The increase in this case averages about 2 vol. % and provides persuasive evidence of the remarkable increase in $C_5+$ yield that is enabled by the present invention's use of a mixture of a conventional rhenium component with a rhenium component derived from an adsorbed rhenium-oxygen complex. Hydrogen selectivities for these four catalysts are given in FIGS. 2 and 5 and it is clear from the data that there is a small sacrifice in hydrogen selectivity in the case of Catalyst A versus Catalyst $C_1$ that accompanies the advance of the present invention; however, at increased metals loading this decrease in hydrogen selectivity completely reverses: witness the data for Catalysts B and $C_2$ in FIG. 4. The data presented in FIGS. 3 and 6 immediately highlights the surprising and significant difference in activity between the two catalyst systems. From the data presented in FIG. 3 it is clear that Catalyst A was on the average about 5° to 10° F. more active than Catalyst $C_1$ when the two catalysts were run at exactly the same conditions. This is an extremely surprising result because of the inability of the platinum-rhenium catalyst systems of the prior art to show any advance in activity over the traditional platinum system; thus it is immediately apparent from the data in FIG. 3 that a significant and unexpected improvement in activity characteristics is a principal advantage of the platinum-rhenium catalyst of the present invention. At higher metals level, this activity advantage is not as prominent (see the comparison for Catalysts B and $C_2$ in FIG. 6) but is nonetheless apparent; at this metals level $C_5+$ yield improvement seems to be the dominant beneficial effect of the present invention rather than substantial activity enhancement. Applying the well known rule of thumb that the rate of reaction approximately doubles for every 20° F. change in reaction temperature, it is manifest that Catalyst A is approximately 25 to 50% more active than Catalyst $C_1$. This significant advance in activity characteristics is coupled with activity-stability characteristics for Catalysts A and B relative to Catalysts $C_1$ and $C_2$ which are equivalent or slightly better than the prior art catalyst system. The activity-stability characteristics are perhaps best judged by examining the slopes of the two curves for Catalysts A and $C_1$ plotted in FIGS. 3 and of the two curves for Catalysts B and $C_2$ shown in FIG. 6. In sum, the cumulative effect of the data plotted in FIGS. 1 through 6 indicate that the catalyst system of the present invention is perceptively more active than the conventional platinum-rhenium catalyst system and that this increase in activity is accomplished while simultaneously dramatically increasing the $C_5+$ selectivity pattern.

In final analysis, it is clear from the data presented in FIGS. 1 through 6 for Catalysts A, B, $C_1$ and $C_2$ that the use of an adsorbed rhenium-oxygen complex to modify a conventional platinum-rhenium catalytic composite provides an efficient and effective means for significantly promoting the activity and $C_5+$ yield selectivity associated therewith when this modified catalyst system is utilized in a high severity reforming operation. It is likewise clear from these results that the catalyst system of the present invention is a difference in kind rather than degree from the platinum-rhenium catalyst systems of the prior art.

It is intended to cover by the following claims all changes and modifications of the above disclosure of the present invention which would be self evident to a man of ordinary skill in the hydrocarbon conversion art or in the catalyst formulation art.

I claim as my invention:

1. A process for converting a hydrocarbon which comprises contacting said hydrocarbon at hydrocarbon conversion conditions with a catalytic composite comprising a reduced combination of a catalytically effective amount of an adsorbed rhenium-oxygen complex with a porous carrier material containing catalytically effective amounts of a rhenium component other than that derived from said rhenium-oxygen complex and of a platinum group component wherein said platinum group component is uniformly dispersed in the carrier material and is maintained in the elemental metallic state during adsorption and reduction of the rhenium-oxygen complex and wherein at least a portion of the rhenium-oxygen complex is adsorbed on the surface of the platinum group component prior to the reduction of the rhenium-oxygen complex.

2. The process as defined in claim 1 wherein the platinum group component is platinum.

3. The process as defined in claim 1 wherein the platinum group component is palladium.

4. The process as defined in claim 1 wherein the platinum group component is rhodium.

5. The process as defined in claim 1 wherein the platinum group component is iridium.

6. The process as defined in claim 1 wherein the porous carrier material contains a catalytically effective amount of a halogen component.

7. The process as defined in claim 6 wherein the halogen component is combined chloride.

8. The process as defined in claim 1 wherein the porous carrier material is a refractory inorganic oxide.

9. The process as defined in claim 8 wherein the refractory inorganic oxide is alumina.

10. The process as defined in claim 1 wherein the adsorbed rhenium-oxygen complex is derived from an aqueous solution of perrhenic acid or of a salt of perrhenic acid.

11. The process as defined in claim 1 wherein the composite contains, calculated on an elemental metallic basis, about 0.01 to about 2 wt. % platinum group metal, about 0.01 to about 2 wt. % rhenium derived from the rhenium component other than said rhenium-oxide complex, and about 0.01 to about 5 wt. % rhenium derived from the adsorbed rhenium-oxygen complex.

12. The process as defined in claim 6 wherein the halogen component is present therein in an amount sufficient to result in the composite containing, on an elemental basis, about 0.1 to about 3.5 wt. % halogen.

13. The process as defined in claim 1 wherein the composite is prepared by the steps of: (a) reacting a solution containing a rhenium-oxygen complex with a porous carrier material containing a rhenium component and a uniform dispersion of a platinum group component maintained in the elemental metallic state at conditions selected to result in at least a portion of the rhenium-oxygen complex being adsorbed on the surface of the platinum group metal; (b) subjecting the resulting reaction produce to drying conditions selected to vaporize the solvent without agglomerating the platinum group component; and thereafter (c) treating the resulting dried reaction product with a dry hydrogen stream at reduction conditions selected to reduce substantially all of the adsorbed rhenium-oxygen complex to the elemental metallic state.

14. The process as defined in claim 13, wherein the reduction conditions include a gas hourly space velocity sufficient to rapidly dissipate any local concentration of water formed from reduction of the adsorbed rhenium-oxygen complex.

15. The process as defined in claim 13 wherein the solution containing a rhenium-oxygen complex is an aqueous solution of perrhenic acid or of a salt of perrhenic acid.

16. The process of claim 1 wherein said hydrocarbon is a gasoline fraction, wherein said hydrocarbon conversion conditions include reforming conditions and wherein said gasoline fraction is reformed in the presence of hydrogen.

17. A process for converting a hydrocarbon which comprises contacting said hydrocarbon at hydrocarbon conversion conditions with a catalytic composite comprising the dried and reduced reaction product formed by reacting a catalytically effective amount of rhenium-oxygen complex with a porous carrier material containing a catalytically effective amount of a rhenium component other than that derived from said rhenium-oxygen complex and a uniform dispersion of a catalytically effective amount of a platinum group component maintained in the elemental metallic state at conditions selected to result in the adsorption of at least a portion of the rhenium-oxygen complex on the surface of the platinum group metal, and thereafter subjecting the resulting reaction product to drying and reduction conditions selected to reduce the adsorbed rhenium-oxygen complex to the elemental metallic state without agglomerating the platinum group component.

18. The process as defined in claim 17 wherein the porous carrier material contains a catalytically effective amount of a halogen component.

19. The process as defined in claim 17 wherein the halogen component is combined chloride.

20. The process as defined in claim 17 wherein the rhenium-oxygen complex is perrhenic acid or of a salt of perrhenic acid.

21. The process for converting a hydrocarbon as defined in claim 1 wherein the contacting of the hydrocarbon with the catalytic composite is performed in the presence of hydrogen.

22. The process as defined in claim 16 wherein the reforming conditions include a temperature of about 700° to about 1100° F., a pressure of about 0 to about 1000 psig., a liquid hourly space velocity of about 0.1 to about 10 hrs.$^{-1}$ and a mole ratio of hydrogen to hydrocarbon of about 1:1 to about 20:1.

23. The process as defined in claim 16 wherein the reforming conditions utilized include a pressure of about 50 to about 350 psig.

* * * * *